United States Patent [19]

Gagliani et al.

[11] 4,305,796
[45] Dec. 15, 1981

[54] METHODS OF PREPARING POLYIMIDES AND ARTIFACTS COMPOSED THEREOF

[75] Inventors: John Gagliani; Raymond Lee; Anthony L. Wilcoxson, all of San Diego, Calif.

[73] Assignee: International Harvester Company, Chicago, Ill.

[21] Appl. No.: 186,629

[22] Filed: Sep. 12, 1980

[51] Int. Cl.³ .................. C08G 18/14; C08G 63/40
[52] U.S. Cl. .................. 204/159.19; 204/159.11; 521/185; 521/915; 528/353
[58] Field of Search .................. 204/159.11, 159.19; 521/185, 915

[56] References Cited

U.S. PATENT DOCUMENTS

| | | | |
|---|---|---|---|
| 3,471,444 | 10/1969 | Sherer | 528/229 |
| 3,677,921 | 7/1972 | Stivers | 260/45.9 R |
| 3,803,103 | 4/1974 | Magay | 428/379 |
| 4,166,168 | 8/1979 | D'Alelio | 204/159.11 |

*Primary Examiner*—Morton Foelak
*Attorney, Agent, or Firm*—LeBlanc, Nolan, Shur & Nies

[57] ABSTRACT

Methods of converting essentially unpolymerized precursors into polyimides in which the precursors are exposed to microwave radiation. Preheating, thermal post-curing, and other techniques may be employed to promote the development of optimum properties; and reinforcements can be employed to impart strength and rigidity to the final product. Also disclosed are processes for making various composite artifacts in which non-polymeric precursors are converted to polyimides by using the techniques described above.

37 Claims, 4 Drawing Figures

FREE RISE  OPEN MOLD  CLOSED MOLD

METHODS OF PREPARING POLYIMIDES AND ARTIFACTS COMPOSED THEREOF

The invention described herein was made in the performance of work under NASA Contract No. NAS9-15484 and is subject to the provisions of section 305 of the National Aeronautics and Space Act of 1958 (72 Stat. 435; 42 USC 2457).

In one aspect our invention relates to polyimides and, more particularly, to novel, improved methods for preparing polymers of that character.

As a class, polyimides are extremely valuable materials because of their chemical inertness, strength, and temperature resistance. There are also certain classes of proprietary polyimides which have such additional advantages as retention of strength, resiliency, and flexibility at cryogenic temperatures; resistance to hydrolysis and ultraviolet degration; capability of undergoing oxidative degradation without generating toxic products or smoke; a novel closed cell structure which suits them for applications in which they are in contact with moving parts; the capacity to be transformed into porous fibers and other shapes and into rigid panels, cushioning, thermal acoustical insulation and a host of other novel products. These polyimides are disclosed in, inter alia, U.S. Pat. Nos. 3,506,583 issued Apr. 14, 1970, to Boram et al; 3,726,831 and 3,726,834 issued Apr. 10, 1973, to Acle et al and Acle respectively; 4,070,312 issued Jan. 24, 1978, to Gagliani et al; and Re. 30,213 issued Feb. 12, 1980, to Gagliani and in pending U.S. patent application Ser. Nos. 935,378 and 952,738 filed Aug. 21, 1978, and Oct. 19, 1978, by Gagliani and 186,668 filed Sept. 12, 1980, by Gagliani et al Application Ser. No. 935,378 has since matured into U.S. Pat. No. 4,241,193 dated Dec. 23, 1980.

These proprietary polyimides are prepared by reacting 3,3',4,4'-benzophenonetetracarboxylic acid or a dianhydride of that acid with a lower alkyl alcohol to form a half ester of the acid and then adding one or more primary diamines to the half ester solution to form an essentially monomeric precursor. This monomer is then converted to a polyimide by heating it.

Many of these polyimides have the added attribute of a cellular or foam type physical structure. The foam can be employed as such—in a seat cushion or as insulation, for example. Or, using the procedure described in application Ser. No. 935,378 as a further example, the flexible, resilient polyimide foam can be converted to a dense, rigid, structurally strong, intumescent material by heating it under pressure. The foam can also be comminuted and used as a molding power as described in U.S. Pat. No. 3,726,834.

The general model for the chemical reactions which are effected in converting the precursor to a polyimide of the character discussed above are shown below. The actual reactions are typically much more complex depending upon the number of diamines in the precursor.

(I) Esterification:

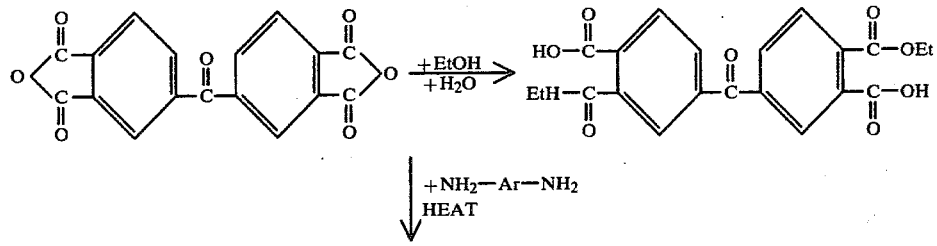

$+NH_2-Ar-NH_2$
HEAT (II) Amidization:

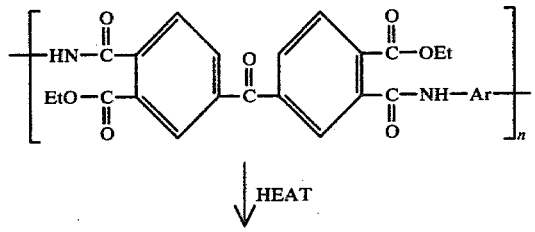

HEAT (III) Imidization:

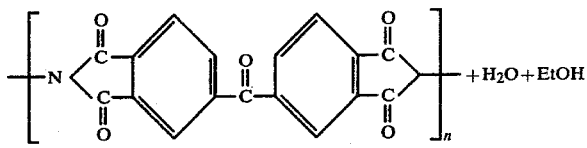

Heretofore, the foaming of the precursor and the curing of the foam to develop the polyimide chemical structure have been accomplished by heating the precursor in a circulating air oven.

We have now discovered that polyimide foams of superior quality can be produced, typically in less time, by employing microwave heating to cure the precursor.

In addition to being faster, microwave heating has the advantages of producing foams with a more homogeneous cellular structure and of making it unnecessary to handle the fragile, uncured foam which is generated as the precursor is heated.

Exemplary of the polyimide foams which can be prepared to advantage by the use of microwave heating in accord with the principles of the present invention are the copolymers described in U.S. Pat. No. Re. 30,213 and the terpolymers described in copending application Ser. No. 186,668.

The patented copolymers are derived from precursors which, in their preferred forms, are essentially equimolar mixtures of a lower alkyl half ester of BTDA and two primary diamines. One of the diamines is a heterocyclic diamine, and the other is an aromatic meta- or para-substituted diamine which is free of aliphatic moieties. A ratio of 0.4 to 0.6 mole of heterocyclic diamine per mole of 3,3',4,4'-benzophenonetetracarboxylic acid ester is preferred as this results in foams with optimal mechanical properties. However, precursors having a heterocyclic diamine/acid ester ratio of 0.3 have also successfully been employed.

The terpolyimides described in copending application Ser. No. 186,668 differ chemically from the copolyimides just described in that they are made from precursors which include an aliphatic diamine in addition to the aromatic and heterocyclic diamines employed in the copolyimide precursors.

From 0.05 to 0.3 mole of aliphatic diamine per 1.0 mole of benzophenonetetracarboxylic acid ester can be employed, and from 0.1 to 0.3 mole of heterocyclic diamine per mole of ester can be used.

Exemplary of the aromatic and heterocyclic diamines that can be employed in the just described copolyimides are:
2,6-diaminopyridine
3,5-diaminopyridine
3,3'-diaminodiphenyl sulfone
4,4'-diaminodiphenyl sulfone
4,4'-diaminophenyl sulfide
3,3'-diaminodiphenyl ether
4,4'-diaminodiphenyl ether
meta-phenylene diamine
para-phenylene diamine
p,p'-methylene dianiline
2,6-diamino toluene
2,4-diamino toluene Many other aromatic and heterocyclic diamines have been described in the open and patent literature dealing with the making of polyimides—see, for example, U.S. Pat. Nos. 3,179,614 issued Apr. 20, 1965, to Edwards; 3,575,891 issued Apr. 20, 1971, to LeBlanc et al; and 3,629,180 issued Dec. 21, 1971, to Yoda et al. Aromatic and heterocyclic diamines selected from those listed in the literature can also be utilized in copolyimides and terpolyimides of the character described above.

Alipathic diamines having from three to 12 carbon atoms have been employed in the terpolyimides. However, diamines having no more than six carbon atoms will typically prove preferable. Also, aliphatic diamines with even numbered chains are preferred.

Aliphatic diamines we have used include:
1,3-diaminopropane
1,4-diaminobutane
1,6-diaminohexane
1,8-diaminooctane
1,12-diaminododecane
and Jeffamine 230. The latter is available from the Jefferson Chemical Company and has the formula:

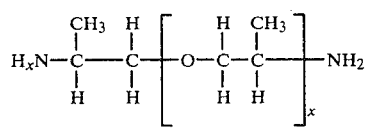

where x is approximately 2.6.

As discussed briefly above, the precursors of the polyimides with which we are concerned are prepared by first reacting 3,3',4,4'-benzophenonetetracarboxylic acid (or preferably, its dianhydride) with an esterification agent to form an alkyl diester or half ester. Exemplary esterification agents are methyl, ethyl, propyl, and isopropyl alcohols. Methanol is in many cases preferred because of its widespread availability, low cost, and other attributes; because its use facilitates conversion of the precursor to a polyimide foam; and because the foams made from the methyl esters tend to be more flexible, resilient, and compression set resistant.

Ethanol is also a preferred esterification agent.

The esterification reaction is followed by the addition of the diamine or diamines, which are dissolved in the reaction mixture. The temperature is kept below the reflux temperature of the esterification agent during dissolution of the diamines and low enough to avoid polymerization of the diamines and ester.

Graphite, glass, and other fibers as well as other fillers such as glass microballoons and additives such as crosslinking agents can be added to the resulting composition to impart wanted properties to the final product. A surfactant can also be added to increase fatigue resistance and to make the foam more flexible and resilient by increasing its bubble stability and the uniformity of the cellular structure.

One preferred surfactant is FS-B, a nonionic, fluorinated, polyalkylene copolymer manufactured by E. I. DuPont de Nemours and Company.

Other surfactants that have been successfully employed are FS-C, AS-2, and X-3, nonionic surfactants of the same general chemical composition as FS-B and manufactured by the same company and L-530, L-5410, and L-5430, which are silicone surfactants manufactured by Union Carbide Company. We employ from 0.015 to 1.5 percent of surfactant based on the weight of the ester and diamine constituents.

The material existing after dissolution of the diamines and the addition of any additives may range in form from a "liquid resin" to a spreadable, pastelike formulation depending upon the nature and quantity of any fillers added to the resin. The material may be used in the form just described; or it can be transformed into an amorphous powder capable of being converted into a flexible, resilient, terpolyimide foam. Although not essential, it is preferred that spray drying be employed for this purpose because the liquid resin can thereby be transformed on a continuous basis and in one step into a dry powder. Also, spray drying allows for modification of the precursor in ways which can be used to vary the properties of the final product.

One suitable spray drying process is described in copending application Ser. No. 186,670 filed Sept. 12, 1980. In general that process involves the atomization of the feedstock followed by entrainment of the droplets thus formed in a swirling annulus of heated air (or other gas). This produces almost instantaneous drying of the droplets. Optimum results are typically obtained by employing spray dryer chamber gas inlet temperatures in the range of 100°–110° C. and by so regulating the flow of material through the dryer as to limit the chamber outlet temperature of the gas to 80° C.

For optimum results the dried precursor is comminuted and/or screened, if necessary, to a size distribution of about 300 microns×0 before it is converted to the corresponding polyimide by microwave heating.

Dry particulate precursors produced by the technique just described can be converted to polyimide foams by the free rise technique; by an open mold, constrained rise technique in which spacers are employed to limit the rise of the foam; or in a closed mold.

Foaming-curing parameters that have proven satisfactory in converting representative precursors to flexible, resilient foams are two to 55 minutes exposure to high frequency radiation in an oven operating at a frequency of 915 to 2450 mHz and at 3.75 to 15 kW power and a power output to precursor unit weight ratio of 0.6 to 1 kW/kg.

Preferably, dry particulate precursors are preheated before they are exposed to microwave radiation. This contributes to higher foam rise, a more homogeneous cellular structure, and a reduced scrap rate.

Preheat temperatures of 121.1° to 148.9° C. (250° to 300° F.) for 2–6 minutes have been successfully employed.

Steady application of the microwave energy is not required, and pulsed or cyclic exposure of the precursor to the microwave energy may even produce superior results. Typically, the duration of the microwave energy pulses and the intervals therebetween will be on the order of 60 and 20 seconds, respectively.

Also, conductive fillers can often advantageously be incorporated in the precursor to promote its conversion to a polyimide by generating additional thermal energy. From 5 to 20 weight percent of activated carbon or graphite can be employed for that purpose.

Another technique that can be used to advantage in making polyimide foams and artifacts including such foams by the practice of the present invention is thermal heating of the microwave cavity. Temperatures in the range of 121.1° to 232.2° C. (250° to 450° F.) are employed.

Similarly, an optimum product can in many, if not most, cases be obtained by heating the substrate or mold on or in which the precursor is foamed to a temperature of 121.1° to 148.9° C. (250° to 300° F.) before the precursor is exposed to microwave energy.

Also, quality may in many cases be optimized by employing different microwave energy power levels to foam the precursor and to subsequently cure the foam. For example in making flexible, resilient, copolyimide foams from precursors of the character described above in existing equipment, a power level of 10 kW for foaming followed by one of 15 kW has been selected as optimum (for terpolyimide systems, power levels of 10 and 8.4 kW were chosen).

In those applications of our invention involving the free rise technique, the depth and loading of the particulate precursor on the substrate are important to the development of a stable, homogeneous structure in the foam to which the precursor is converted. The powder should be at least 0.5 cm deep. Powder loadings as low as 1.6 kg/m² have been successfully employed. However, loadings in the range of 4.3 to 15 kg/m² are preferred; and loadings of ca. 4.3 and 7.7 kg/m² are thought to be optimum in most cases for terpolyimide and copolyimide systems, respectively.

Also, it has been found in the free rise foaming techniques that optimum yields are obtained from square shaped beds rather than those of rectangular configuration.

As suggested above, it is not essential that the precursor be dried before it is foamed. In fact, the use of a liquid resin precursor can often be employed to advantage—e.g., in making composite products such as reinforced panels.

Another aspect of our invention, in this regard, resides in novel, improved processes for making artifacts of the type just described and others of comparable character.

In one exemplary process for making panels in accord with the principles of our invention, a liquid resin precursor as described above and compounded with selected fillers is spread on glass cloth (e.g., Owens Corning Style 120) wet with the resin. A second resin wetted glass cloth is placed on top the compounded resin.

Solvent is removed by heating the resulting sandwich in a circulating air oven at a temperature of not more than 300° and preferably about 250° F. for 2 to 16 hours or by exposing it to microwave radiation for 2.25 to 12 minutes, typically at a power level on the order of 1.25 to 2 kW.

Foaming and curing of the precursor by the open mold, constrained rise technique using the process parameters described above follows the solvent removal step; and this is typically succeeded by thermal postcuring as described hereinafter.

Various fillers including glass strands and microballoons can be employed in panels made by the techniques just described. From 5 to 40 weight percent of filler based on the weight of the polyimide into which the precursor is converted can be used.

One exemplary combination of fillers that has proven satisfactory is 7.5 to 10 weight percent of unsized or heat cleaned, glass strands and 12.5 to 15 weight percent of glass microballoons (e.g., 3M Company C-15X).

In applications of our invention such as that just described the liquid resin precursor will typically be diluted with an alkyl alcohol in a ratio of 20 parts per hundred (phr) of resin in the case of copolyimide systems and 30 phr if terpolyimide resins are involved before the filler(s) is added. In such cases we have found that the quality of the product is optimized by reducing the solvent content of the resin and reinforcement mixture to a level of 29–31 weight percent by thermal or microwave drying before the precursor is foamed.

In the foregoing and other applications of our invention, the microwave heating step or steps can often be followed to advantage by the thermal postcure of the polyimide mentioned above. This is accomplished by heating the product of the microwave heating step in a circulating air oven at a temperature of 500° to 550° F. for 30 to 200 minutes to complete the curing of the polyimide.

All of the techniques for heating the precursor described above require that a substrate or mold material which is compatible with the microwave radiation be employed. In the open and closed mold techniques, the material must also have sufficient flexural strength to withstand the pressure of the expanding foam. Substrate and mold materials that have been found suitable include Ridout Plastics Company polypropylenes lined with a Teflon coated glass (Taconic 7278); Pyroceram (a Corning Glass crystalline ceramic made from glass by controlled nucleation); and glass filled polyimides. Other materials possessing the necessary attributes discussed above can also be employed.

From the foregoing it will be apparent to the reader that one primary object of the present invention resides in the provision of novel, improved methods of preparing polyimide foams from their precursors and for preparing artifacts containing such foams.

Related, also important, but more specific objects of our invention reside in the provision of methods of the character just described;

which can be employed to make products as diverse as flexible, resilient foams; rigid, high strength panels; and molding powders;

which, in conjunction with the preceding object, afford ready control over the mechanical properties of the polyimides into which the precursors are converted;

which are relatively economical and capable of producing high quality products in high yield;

which can be employed to convert precursors that are mixtures of benzophenonetetracarboxylic acid esters and primary diamines to the corresponding polyimides and which make it unnecessary to handle the fragile, uncured foams generated in converting the precursors to the polyimides;

which can be employed to convert both liquid resin and dry particulate precursors to polyimides as well as such precursors compounded with fillers and additives;

which can be used in conjunction with free rise foaming techniques and with open and closed mold techniques as well;

which can be employed to produce polyimide foams and polyimide foam-containing artifacts in large sizes.

Another important, and primary, object of the present invention resides in the provision of novel, improved methods of manufacturing polyimide foams and foam-containing artifacts in which microwave heating is employed to foam the precursor and to cure the foam.

Related, more specific, but nevertheless important objects of our invention reside in the provision of methods for manufacturing polyimides and polyimide-containing artifacts as recited in the preceding objects in which one or more of the following techniques is utilized in conjunction with microwave heating to tailor the properties or optimize the quality of the foam or artifact or to optimize the yield of foam: thermal postcuring of the foam; preheating of the substrate or mold on or in which the precursor is foamed or cured; power stepped and pulsed applications of the microwave energy to the material being processed; incorporation of conductive fillers in the precursor; and square shaped beds or loadings of the precursor.

Other important objects and features and additional advantages of our invention will become apparent from the foregoing, from the appended claims, and as the ensuing detailed description and discussion proceeds in conjunction with the working examples in which that discussion and description is incorporated and the accompanying drawing in which:

Figure 1:
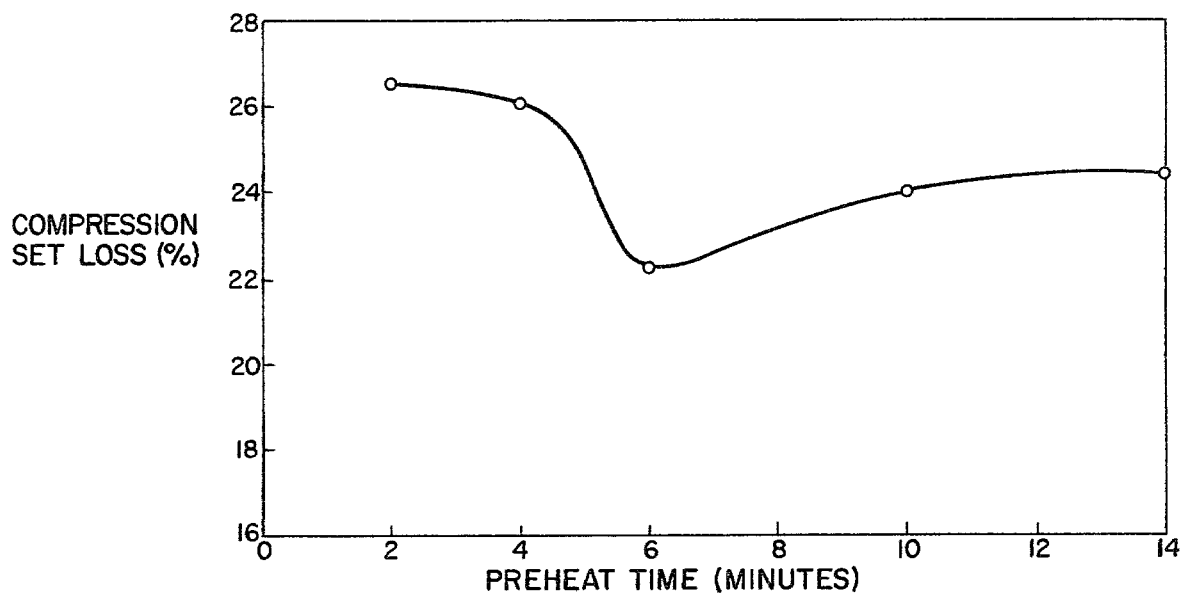
FIG. 1 shows the effect of preheat on a representative and important mechanical property of a polyimide prepared from its precursor by microwave heating in accord with the principles of the present invention.

The working examples follow:

EXAMPLE I

Among the polyimide systems which have been foamed and cured by the techniques disclosed herein and subsequently evaluated are 1701-1 and 1702-1, both copolyimides, and 1720-1 which is a terpolyimide.

The 1702-1 precursor was prepared by adding 3,3',4,4'-benzophenonetetracarboxylic acid dianhydride (322.2 g, 1.0 mole) to 240 ml of methyl alcohol and 24 ml of $H_2O$ in a one-liter, three-neck flask equipped with a thermometer, a mechanical stirrer, and a reflux condenser. After addition, the mixture was heated and refluxed until clear. The mixture was then refluxed for an additional 60 minutes to ensure complete esterification of the acid to its half ester.

The reaction mixture was then cooled to 40°-50° C. (104°-122° F).

2,6 Diaminopyridine (32.8 g, 0.3 mole) and p-p'methylene dianiline (138.7 g, 0.7 mole) were added to the half ester solution, and the mixture was heated at 60°-65° C. (140°-149° F.) for five minutes.

FS-B surfactant was next added to the mixture in an amount of 0.1 percent based on the weight of the methyl half ester and the diamines.

In some cases the liquid resin precursor this produced was converted to a dry particulate form using the spray drying technique described in copending application No. 186,670 with a spray dryer inlet temperature of 100° C., an outlet temperature of 63°-70° C., and an atomizer speed of 30,000 to 32,000 rpm.

The precursor was diluted with methanol in a ratio of 20 parts of the alcohol to 100 parts of resin before it was spray dried.

The dried powder was collected, sieved through a No. 48 Tyler mesh screen (297 micron diameter openings) and rolled for 30 minutes in a round plastic bottle to eliminate lumps.

The 1701-1 precursors (liquid resin and dry powder) were prepared in the manner just described from the same compounds using a 3,3',4,4'-benzophenonetetracarboxylic acid methyl ester: 2,6-diamino pyridine: p,p'-methylene dianiline molar ratio of 1.0:0.4:0.6.

The 1720-1 terpolyimide precursors were prepared by forming the methyl half ester of 3,3',4,4'-benzophenonetetracarboxylic acid in the manner described above. The half ester solution was cooled to 25°-35° C. (77°-95° F.) and 2,6 diaminopyridine (32.8 g, 0.3 mole) and p-p'-methylene dianiline (99.1 g, 0.5 mole) were added and the contents of the flask mixed for 15 minutes. 1,6 Diaminohexane (23.7 g, 0.2 mole) was then added at a slow enough rate to keep the reaction temperature from exceeding 65° C. (149° F.), completing the preparation of the liquid resin.

To make the dry particulate resins, FS-B surfactant (0.1 weight percent) was added to the liquid resin, the latter diluted with 30 phr of methyl alcohol, and the resulting liquid spray dried with the reactor operated at an inlet temperature of 100° C. and outlet temperatures in the range of 69°-75° C.

Numerous tests we have made show that flexible resilient polyimide foams can be produced from dry particulate precursors of the character described above by microwave heating.

Those precursors and a number of variants were loaded onto appropriate substrates, placed in the microwave cavity of a 5 kW Gerling Moore Batch Cavity Model 4115 microwave open, and exposed to microwave radiation at frequencies of 915 and 2450 mHz to foam the material by the free rise technique and, in some cases, at least partially cure it. Curing was completed by heating the foam in a Blue M, circulating air, industrial oven.

Foam rise, cellular structure, resiliency, striations, density, fatigue, compression set, indentation load deflection, hydrolytic stability, and flammability were determined although not all of these parameters were measured in every test.

Indentation load deflection (ILD) is a measure of the force required to compress a polymeric foam to a specified percentage of its original thickness. ILD is accordingly indicative of the softness or seatability of a foam.

Compression set is the permanent deformation obtained by subjecting a foam to a specified compressive stress (load and time). Compressive set is also indicative of the seatability of a foam and, in addition, is a measure of its durability.

Compression set of the foams at 90 percent compression was determined according to ASTM Standard D-1564, Method B, using two steel plates held parallel to each other by clamps with the space between the plates adjusted to the required thickness by spacers.

The resistance of the foam to cyclic shear loadings (fatigue test) was determined in accordance with ASTM Standard D-1564, Procedure B, with the exception that examination and measurement of the foam for loss of thickness was made at 10,000 and 20,000 cycles. The fatigue tester was constructed in accordance with the ASTM Standard just identified.

The flammability characteristics of the foams were obtained by determination of the smoke density in accordance with the procedure for utilizing the NBS Smoke Density Chamber (see American Instrument Co., Aminco Catalog No. 4-5800, Instruction No. 941). The relative flammabilities of the foams were determined by measuring the minimum of oxygen and nitrogen that will just support combustion of the material (LOI). The test apparatus for this determination was prepared in accordance with ASTM Standard D-2863.

Density tests were made in accordance with ASTM Standard D-1564, Suffix W. Density of the polyimide foam is important because most physical properties of a polymeric foam approach a straight-line relationship to density. Among the important properties of which this is true are indentation load deflection and compression set.

Hydrolytic tests were conducted in a controlled temperature humidity chamber (Blue M) for a period of 30 days at 60° C. (140° F.) and 100 percent relative humidity.

Results of exemplary tests are tabulated below:

TABLE 1

Mechanical Properties of 1701-1 Polyimide Foams

| FOAM NO. | SURFACTANT (AS-2) CONCENTRATION | DENSITY Kg/m³ | DENSITY Lbs/ft³ | INDENTATION LOAD DEFLECTION (ILD) N 25% | ILD N 65% | ILD Lbs. 25% | ILD Lbs. 65% | COMPRESSION SET LOSS (%) | RESILIENCY BEFORE FATIGUE | AFTER FATIGUE (100,000 Cycles) RESILIENCY | AFTER FATIGUE (100,000 Cycles) HEIGHT LOSS |
|---|---|---|---|---|---|---|---|---|---|---|---|
| 7 | 0.1 | 12.8 | 0.8 | | | | | 49 | 42 | * | * |
| 8 | 0.25 | 17.0 | 1.06 | 120.1 | 400.3 | 27 | 90 | 33 | 45 | * | * |
| 9 | 0.5 | 15.2 | 0.95 | 177.9 | 631.6 | 40 | 142 | 46 | 55 | 40 | 60 |
| 10 | 0.75 | 13.6 | 0.85 | 122.3 | 386.9 | 27.5 | 87 | 29 | 45 | 30 | 41.1 |
| 11 | 1.0 | 9.6 | 0.6 | 133.4 | 542.6 | 30 | 122 | 30 | 35 | 20 | 58.2 |
| 12 | 1.5 | 12.8 | 0.8 | 151.2 | 556.0 | 34 | 125 | 30 | 45 | 20 | 54.9 |

*Cellular structure collapsed during fatigue.

TABLE 2

Mechanical Properties of 1702-1 Polyimide Foams

| FOAM NO. | SURFACTANT (AS-2) CONCENTRATION | DENSITY Kg/m³ | DENSITY Lbs/ft³ | ILD N 25% | ILD N 65% | ILD LBS 25% | ILD LBS 65% | COMPRESSION SET LOSS (%) | RESILIENCY BEFORE FATIGUE | AFTER FATIGUE (100,000 Cycles) RESILIENCY | AFTER FATIGUE (100,000 Cycles) HEIGHT LOSS |
|---|---|---|---|---|---|---|---|---|---|---|---|
| 13 | 0.1 | 14.4 | 0.9 | 133.4 | 489.3 | 30 | 110 | 54 | 47 | 50 | 36.0 |
| 14 | 0.25 | 14.4 | 0.9 | 142.3 | 515.9 | 32 | 116 | 40 | 45 | 50 | 34.0 |
| 15 | 0.5 | 13.8 | 0.86 | 146.8 | 525.9 | 33 | 116 | 43 | 60 | 50 | 30.4 |
| 16 | 0.75 | 12.8 | 0.8 | 133.4 | 472.5 | 30 | 106 | 40 | 42 | 45 | 33.7 |
| 17 | 1.0 | 9.8 | 0.61 | 146.8 | 502.6 | 33 | 113 | 52 | 40 | * | * |
| 18 | 1.5 | 10.9 | 0.68 | 142.3 | 544.8 | 32 | 122.5 | 43 | 47 | * | * |

*Cellular structure collapsed during fatigue.

TABLE 3

Mechanical Properties of 1720-1 Polyimide Foams

| FOAM NO. | SURFACTANT (AS-2) CONCENTRATION | DENSITY Kg/m³ | DENSITY Lbs/ft³ | ILD N 25% | ILD N 65% | ILD Lbs. 25% | ILD Lbs. 65% | COMPRESSION SET LOSS (%) | RESILIENCY BEFORE FATIGUE | AFTER FATIGUE (100,000 Cycles) RESILIENCY | AFTER FATIGUE (100,000 Cycles) HEIGHT LOSS |
|---|---|---|---|---|---|---|---|---|---|---|---|
| 1 | 0.1 | 24.0 | 1.5 | 293.6 | 1427.8 | 66 | 321 | 49 | 50 | 55 | +3.9 |
| 2 | 0.25 | 25.6 | 1.6 | 266.9 | 1352.2 | 60 | 304 | 37 | 45 | 47 | +5.3 |
| 3 | 0.5 | 22.4 | 1.4 | 266.9 | 1165.4 | 60 | 262 | 35 | 40 | 37 | +2.0 |
| 4 | 0.75 | 22.4 | 1.4 | 195.7 | 1009.7 | 44 | 227 | 34 | 40 | 43 | −2.9 |
| 5 | 1.0 | 18.4 | 1.15 | 155.7 | 800.7 | 35 | 180 | 27 | 45 | * | * |
| 6 | 1.5 | 17.0 | 1.06 | 155.7 | 809.5 | 35 | 182 | 27 | 50 | * | * |

*Cellular structure collapsed during fatigue.

TABLE 4

Hydrolytic Stability of Flexible Resilient Polyimide Foams at 60° C. and 100 Percent Relative Humidity

| RESIN NO. | SURFACTANT (AS-2) CONCENTRATION (%) | MODIFICATION | DENSITY Kg/m³ | Lbs/ft³ | RESILIENCY | FINAL PROPERTIES (AFTER 30 DAYS) RESILIENCY | REMARKS |
|---|---|---|---|---|---|---|---|
| 1701-1 | 0.05 | — | 25.6 | 1.6 | 50 | 45 | Almost no change |
| 1702-1 | 0.05 | — | 16.0 | 1.0 | 60 | 25 | Brittle |
| 1720-1-24 | 0.05 | Diaminohexane | 16.0 | 1.0 | 60 | 45 | Almost no change |

Data obtained with various samples from the same resin systems show that there is a clear relationship between density and hydrolytic stability. Foams possessing densities above 24 kg/m³ (1.5 lbs/ft³) withstood the 60° C., 100 percent relative humidity test without noticeable adverse effect.

Figure 4:
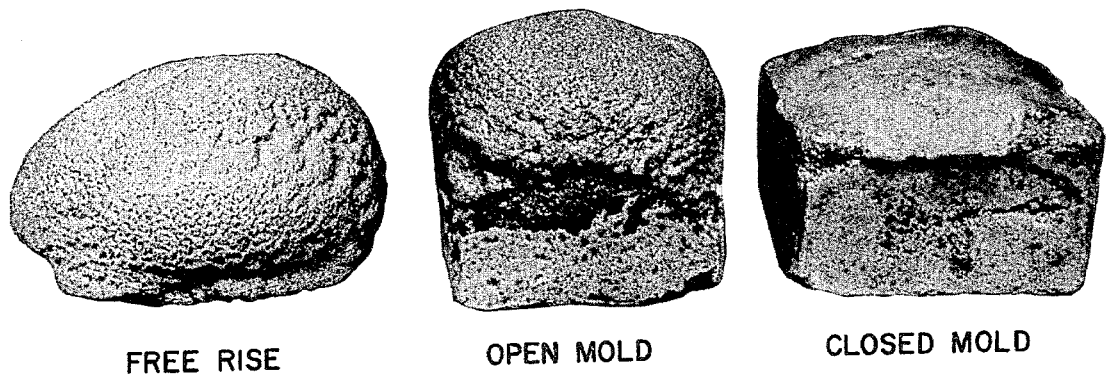
FIG. 4 shows, pictorially, the differences obtained by foaming and curing one representative precursor with microwave radiation and with free rise, open mold, and closed mold techniques in accord with the principles of our invention.

An exemplary foam made by the free rise technique described in this Example is shown at the left in FIG. 4.

EXAMPLE II

As discussed above, the material on or in which the precursor is supported while it is exposed to microwave radiation has a marked effect on the product foam. This was confirmed by a series of tests using the test protocol described in Example I and a variety of substrates and a 1702-1 precursor. The results of these tests appear in the following table:

TABLE 5

Substrates; Effect on Foam Properties

| SUBSTRATE | TEMP. RISE AT END OF FOAMING CYCLE (%) | FOAM VOL. cm³ × 10 | DENSITY kg/m³ | RESILIENCY (BALL REBOUND) | COMPRESSION SET (% LOSS AFTER 30 MINUTES RECOVERY) |
|---|---|---|---|---|---|
| Teflon | 141 | 15.9 | 9.0 | 75 | 40 |
| Glass Filled Polyimide | 143 | 9.6 | 8.6 | 55 | 35 |
| Pyroceram | 176 | 11.6 | 10.4 | 60 | 30 |
| Pyrex | 154 | 8.5 | 10.1 | 50 | 30 |
| Glass Filled Teflon | 158 | 10.8 | 10.7 | 65 | 25 |
| Teflon Coated Glass | 145 | 9.3 | 13.6 | 70 | 20 |
| Kapton | 148 | 10.1 | 13.1 | 70 | 25 |
| Polypropylene | 121 | 11.0 | 10.1 | 65 | 31 |

EXAMPLE III

We pointed out above that, in at least some of the systems with which we are concerned, preheating of the precursor before it is exposed to microwave radiation can be employed to advantage. The effects of preheat are demonstrated by a study in which the effect of preheat temperature at constant preheat time was evaluated at four different temperatures using 1701-1 precursors modified with 0.015 and 0.05 weight percent of AS-2 surfactant. These were 121.1° C. (250° F.), 176.7° C. (350° F.), 232.2° C. (450° F.), and 287.8° C. (550° F.). The time of preheat was kept constant at 2 minutes.

Results of these tests appear in the following table:

TABLE 6

Effect of Preheat Temperature on Properties of Polyimide Foams Derived From 1701-1 Precursors

| FOAM PRECURSOR | SURFACTANT CONCENTRATION As-2 (%) | PREHEAT TIME (MINUTES) | PREHEAT TEMPERATURE (°C.) | (°F.) | DENSITY kg/m³ | lbs/ft³ | RESILIENCY | COMPRESSION SET LOSS (%) | TYPE OF FOAM |
|---|---|---|---|---|---|---|---|---|---|
| 1701-1 | 0.015 | 2 | 121.1 | 250 | 11.7 | 0.73 | 80 | 26.6 | Good cellular structure; highly reticulated |
| 1701-1 | 0.015 | 2 | 176.7 | 350 | 10.7 | 0.67 | 80 | 28.5 | Good cellular structure; moderate reticulation |
| 1701-1 | 0.015 | 2 | 323.2 | 450 | 12.2 | 0.76 | 70 | 27.8 | Fair cellular structure with flaws and striations |
| 1701-1 | 0.015 | 2 | 287.8 | 550 | 14.1 | 0.88 | 75 | 26.9 | Poor cellular structure |
| 1701-1 | 0.015 | 1 | 287.8 | 550 | 14.1 | 0.88 | 75 | 26.0 | Good cellular structure, densified layer |
| 1701-1 | 0.015 | 0.25 | 287.8 | 550 | 12.3 | 0.77 | 50 | 24.5 | Good cellular structure |
| 1701-1 | 0.05 | 2 | 121.1 | 250 | 15.2 | 0.95 | 70 | 16.3 | Fine cellular structure |
| 1701-1 | 0.05 | 2 | 176.7 | 350 | 15.9 | 0.99 | 90 | 19.0 | Good reticulation, flaws |
| 1701-1 | 0.05 | 1 | 232.2 | 450 | 17.5 | 1.09 | 45 | 22.9 | Good cellular structure, increasing flaws |
| 1701-1 | 0.05 | 1 | 287.8 | 550 | 16.5 | 1.03 | 45 | 16.0 | Poor cellular structure |

The data show that preheating the polyimide precursor at temperatures below 300° F. (149° C.) prior to microwave foaming contributes to higher foam rise, lower scrap rate, and a more homogeneous cellular structure. When the microwave foaming process is carried out after preheating the powder at 300° F. and higher, the foam rise is erratic; and cavities, large flaws, and striations were observed. The data also indicate that the compression set properties are independent of preheat temperature when the time is kept constant.

In a second part of the same study, the preheat temperature was kept constant at 250° F., and the effect of preheat time was evaluated at various time intervals. The data from this study are shown graphically in FIG. 1. It is clear from that figure that preheat time does have a significant effect on the product foam.

EXAMPLE IV

Another above discussed variation of our basic process that can on occasion be used to advantage is to heat the cavity of the microwave oven. This was confirmed by tests in which a heated cavity was duplicated by a preheated Pyrex bell jar 38 cm in. diameter and 30 cm high placed upside down on a preheated Telfon substrate. This produced a heated cavity within the microwave cavity of the Gerling Moore oven.

Forty grams of 1702-1 powder precursor and the bell jar were so loaded on the substrate that the precursor was contained within the jar. Microwave power was then applied to foam the powder precursor at a predetermined cavity temperature.

When the bell jar was not preheated the foam rise was very low and erratic.

When foaming was preceded by preheating the bell jar and the substrate at 250° F., the foam rise was very high; the cellular structure was very uniform; and the foam possessed a thin glazed skin. The scrap rate of this foam was very low.

When the temperature of the cavity was increased above 231.2° C. (450° F.) thermal foaming and microwave foaming occurred simultaneously; and the foam structure became very poor.

EXAMPLE V

Still another technique that can on occasion be employed to advantage in the practice of the present invention is the incorporation of a conductive filler in the precursor. Appropriate fillers are capable of interacting with the microwave field and consequentially producing sufficient thermal energy to permit foaming and curing of polyimide precursors in a single step.

A study demonstrating this was carried out by compounding 20 percent by weight of selected conductive fillers in 1702-1 precursors and then processing the resulting compositions in the Gerling Moore oven as described in Example I. The fillers were:
Micromesh Graphite Powder
Activated Carbon Powder
Titanium Dioxide
Hydrated Alumina
Boron Nitride
Wood Resin
Pelargonic Acid Graphite proved capable of producing a temperature increase of 191° C. (375° F.) and partial curing of the foams. For activated carbon the temperature increase was in excess of 315° C. (600° F.) (and possibly higher because the foams began to char). None of the other additives produced any significant thermal effect.

On the basis of these findings, activated carbon was selected for further study. Precursors derived from 1702-1 resins were modified by the addition of various amounts of activated carbon and foamed by the method just described. The results of these experiments are reported in Table 7.

TABLE 7

Effect of Carbon Concentration on Foaming Behavior of 1702-1 Precursors

| PERCENT OF ACTIVATED CARBON IN PRECURSORS | Time to Incipient Foaming (Seconds) | Foam Characteristics |
|---|---|---|
| 2 | 120 | Good cellular structure, no curing |
| 4 | 60 | Good cellular structure, no curing |
| 10 | 40 | Good cellular structure, complete curing |
| 20 | 15 | Good cellular structure, charring |

The energy absorbed during the microwave heating step was found to be dependent on the size of the precursor charge. When large size foams were prepared by this process (600 g of precursor), foaming and curing occurred at filler concentrations as low as four to five percent.

It was also determined that higher surfactant concentrations (0.3–1.0 weight percent) are required to minimize cavities and other imperfections and thereby produce homogeneous foams when large size pieces of foams are produced by this conductive filler technique.

EXAMPLE VI

That microwave radiation frequency and power output are important in the foaming and curing of polyimides by the process we have invented was demonstrated by foaming and curing 1702-1 precursors in the microwave oven described above using the Example I procedure and a microwave frequency of 2450 mHz and by processing the same precursors in a 15 kW GFE Gerling Moore microwave oven using essentially the same procedure with a Pyroceram substrate.

Results of these tests are summarized in the tables which follow:

TABLE 8

Microwave Foaming and Curing of 1702-1 Precursors With 0.02 Weight Percent AS-2 Surfactant in 15 kW Microwave Oven

| EXPERIMENTAL NUMBER | FOAMING TECHNIQUE | FOAMING POWER (kW) | FOAMING TIME (MIN) | CURING METHOD | CURING kW | CURING TIME (MIN) | POWDER CHARGES Kg | POWDER CHARGES Lbs | FINISHED FOAM SIZES CENTIMETERS | FINISHED FOAM SIZES INCHES | FOAM CHARACTERISTICS |
|---|---|---|---|---|---|---|---|---|---|---|---|
| 11 | FR | 10.0 | 15 | MW | 15.0 | 30 | 8.8 | 19.4 | 165 × 65 × 20 | 65 × 25.5 × 8 | Homogeneous cellular structure - one striation |
| 12 | FR | 10.0 | 15 | MW | 15.0 | 23 | 11.0 | 24.2 | 183 × 84 × 20 | 72 × 33 × 8 | Homogeneous cellular structure |
| 13 | FR | 10.0 | 15 | MW | 13.9 | 25 | 15.0 | 33.0 | 183 × 66 × 25 | 72 × 26 × 10 | Homogeneous cellular |

TABLE 8-continued

Microwave Foaming and Curing of 1702-1 Precursors With 0.02 Weight Percent AS-2 Surfactant in 15 kW Microwave Oven

| EXPERIMENTAL NUMBER | FOAMING TECHNIQUE | POWER (kW) | TIME (MIN) | CURING METHOD | kW | TIME (MIN) | POWDER CHARGES Kg | Lbs | FINISHED FOAM SIZES CENTIMETERS | INCHES | FOAM CHARACTERISTICS |
|---|---|---|---|---|---|---|---|---|---|---|---|
| | | | | | | | | | | | structure |

FR = Free Rise
TH = Thermal
MW = Microwave

TABLE 9

Effect of Microwave Power on Foaming and Curing Behavior of 1702-1 Precursors
(5% Activated Carbon; 0.5% AS-2; 5 kW Microwave Oven)

| Power Output (KW) | Foaming Behavior | Compression Set Loss (%) |
|---|---|---|
| 1.25 | No curing; poor structure | — |
| 2.5 | No curing; good structure | — |
| 3.75 | Partial curing; good structure | — |
| 5.0 | Almost complete curing; good structure | 70 |

The data show that a minimum power output of 2.5 kW was necessary to develop a satisfactory cellular structure in the 1702-1 system. It also demonstrates that both foaming and curing can be accomplished by exposure to microwave energy alone at high power outputs.

Tests of the character just described were also made in a Gerling Moore microwave oven operating at a frequency of 915 mHz.

The 915 mHz tests were started at a power of 10 kW with the highest foam rise at 15 to 20 kW. The 915 mHz frequency will therefore foam polyimide resin precursors; but the interaction of the precursors at this frequency is not as rapid as at the 2450 mHz frequency, and foaming is more dependent on the size of the charge being processed.

In the course of the power output studies it was found that pulsing of the microwave energy may also prove advantageous. This was confirmed by tests in which 1702-1 precursors modified with 0.75 weight percent of AS-2 surfactant were processed in the 15 kW microwave oven on a Teflon-coated glass substrate by the free rise technique described in Example I.

Pulsing was carried out by automatically and alternately switching the microwave power ON for 60 seconds and OFF for 20 seconds during the foaming and curing process. A power output of 8.4 kW for 15 minutes was used for foaming, and this was followed by a microwave radiation cure at 15 kW for 15 minutes and a thermal cure in the circulating air oven at 243° C. (470° F.) for 1–2 hours depending upon the particular test.

The foams obtained by this pulsing technique using 10 kg/m² loading possessed a very homogeneous cellular structure and were practically free of reticulation and flaws.

Properties of a foam thus manufactured, compared with the goals that foam was intended to reach, are summarized in the following table:

TABLE 10

| PROPERTY | ASTM METHOD | UNITS | GOAL | ACTUAL |
|---|---|---|---|---|
| Flexible Resilient Foam 1720-1 Resin | | | | |
| Density | D-1564 | Kg/m³ lbs/ft³ | 40.0 2.5 | 25.8 1.6 |
| Tensile Strength | D-1564 | N/m² (psi) | 82.7 × 10³ (12.0) | 246.0 × 10³ (35.7) |
| Elongation | D-1564 | % | 30–50 | 26.8 |
| Tear Resistance | D-1564 | N/m lbs/in. | 175.1 1.0 | 205.7 1.17 |
| Indentation Load Deflection | D-1564 | | | |
| 25% | | N/3.2 dm² | 111.2–155.6 | 442.5 |
| | | lb-force/50in² | 25–35 | 99.5 |
| 65% | | N/3.2 dm² | 667–1112.0 | 1968.2 |
| | | lb-force/50in² | 150–250 | 442.5 |
| Compression Set | D-1564 | % Loss | | |
| 90% | | | 12–15 | 49.9 |
| 50% | | | 7–10 | 12.85 |
| Corrosion | FTMS No. 151 | | None | No evidence |
| Resilience Rebound Value | D-1564 | | 50 min. | 58 |
| Dry Heat | D-1564 | % Loss Tensile Strength | 20 max. | 5.0 |
| Humidity 73.9° C. (165° F.) 100% R.H. | D-1565 | % Loss ILD | 20 max. | 7.9 |
| Fatigue | D-1564 | % Loss ILD | | |
| 10,000 cycles | | | 20 max. | 7.8 |
| 20,000 cycles | | | 20 max. | 15.5 |
| Odor | | | None | No detectable |
| Oxygen Index | D-2863 | % Oxygen | 40 min. | 38 |
| Smoke Density DS uncorrected | MBS | Optical density | 30–50 max. | 3 |
| Thermostability | Thermogravimetric Analy- | Loss 204°0 C. (400° F.) | None | No Loss |

TABLE 10-continued

| | Flexible Resilient Foam 1720-1 Resin | | | |
|---|---|---|---|---|
| PROPERTY | ASTM METHOD | UNITS | GOAL | ACTUAL |
| | sis | | | |

EXAMPLE VII

The thickness of the precursor charge and the loading factor (weight per unit area) also have a considerable effect on the foaming of the particulate precursor. This is demonstrated by tests employing 1702-1 and 1720-1 precursors, the procedure of Example I, a microwave radiation frequency of 2450 mHz, a power output of 10 kW, and a 3 to 6 minute heating cycle.

Results of these tests appear in the following tables:

TABLE 11

Effect of Powder Loading on Properties of Polyimide Foams Derived From 1702-1 Precursors

| Powder Loading | | | | Compression Set Loss | |
|---|---|---|---|---|---|
| Thickness | | Mass | | | |
| cms. | in. | kg/m$^2$ | lbs/ft$^2$ | % | Foaming Behavior |
| 0.51 | 0.2 | 1.6 | 0.32 | 40 | Medium cellular structure, flaws |
| 1.02 | 0.4 | 2.4 | 0.49 | 45 | Medium cellular structure |
| 1.52 | 0.6 | 4.0 | 0.81 | 47 | Good cellular structure |
| 2.79 | 1.1 | 6.5 | 1.33 | 57 | Good cellular structure |

TABLE 12

Effect of Thickness on Foaming Behavior of 1720-1 Precursors

| Powder Thickness | | Rough Cut Yield | |
|---|---|---|---|
| cm | Inch | m$^2$ | ft$^2$ |
| 3.2 | 1.25 | 0 | 0 |
| 6.3 | 2.5 | 8.5 | 92 |
| 10.2 | 4 | 12.4 | 135 |
| 12.6 | 5.0 | 11.3 | 123 |
| 17.7 | 7.0 | 2.7 | 29.1 |

The data show that greater thicknesses contribute to curing and that the quality of the foam is highly dependent on the thickness of the charge and on the powder loading factor.

In the course of the tests just described it was also observed that, as a corollary, foams of higher quality were obtained from square beds than from beds with elongated configurations.

EXAMPLE VIII

The duration of the period for which the precursor is exposed to microwave radiation to foam (or foam and cure) it is also an important parameter of our process.

Figure 2:
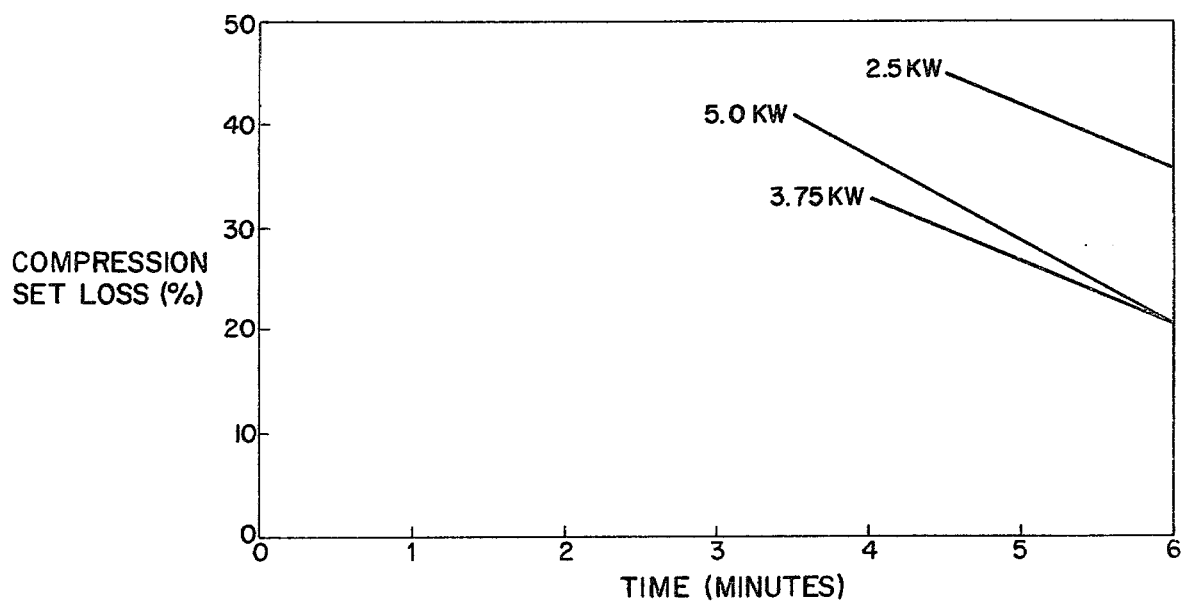
FIG. 2 shows the effect of variations in microwave energy power output on the same property.

One study in accord with the procedure of Example I of the effects of foaming time on foam properties was carried out using 1720-1 terpolyimide precursors containing 0.05 percent AS-2 surfactant. Foaming was at power outputs of 2.5, 3.75, and 5.0 kW. Results of this study are shown graphically in FIG. 2.

The data show that, for all power outputs, increased foaming time produces foams with better compression set. A foaming time of six minutes at a microwave power output of 3.75 kW appears to offer the best conditions for processing the particular terpolyimide system of this study as shown by the compression set values. Foams derived from 1720-1 terpolyimide precursors foamed at these conditions were flexible; resilient; and possessed a fine, homogenous cellular structure with the best compression set.

The optimum time of exposure to the microwave radiation will of course vary from application-to-application depending upon a variety of factors such as the polyimide system involved, the presence or absence of conductive fillers (see Example V), the thickness and loading factor of the precursor charge, the power output, etc.

For example, in foaming 8.8 kg charges of 1702-1 precursors modified with 0.02 weight percent of AS-2 surfactant, 15 minute exposures at a power output of 10 kW followed by 25 to 40 minutes exposure at a power output of 13.9 to 15 kW were employed to produce pieces of foam with dimensions as large as 72 by 76 inches and thicknesses up to 10 inches. That those foams had acceptable properties is shown by the data in Table 12 above.

EXAMPLE IX

Another above discussed, and important, parameter of our process is the temperature used in postcuring the polyimide foam when that technique is employed.

Exemplary of many studies in which this was confirmed was one in which 600 g lots of 1701-1 powder precursors modified with 0.015 and 0.02 percent of AS-2 surfactant were foamed on Teflon substrates in the 5 kW microwave oven by the free rise technique. The foams were then thermally postcured in the circulating air oven at temperatures of 260°, 288°, 315°, and 330° C. (500°, 550°, 600°, and 625° F.). The curing times at each temperature were 30, 60, and 90 minutes.

Figure 3:
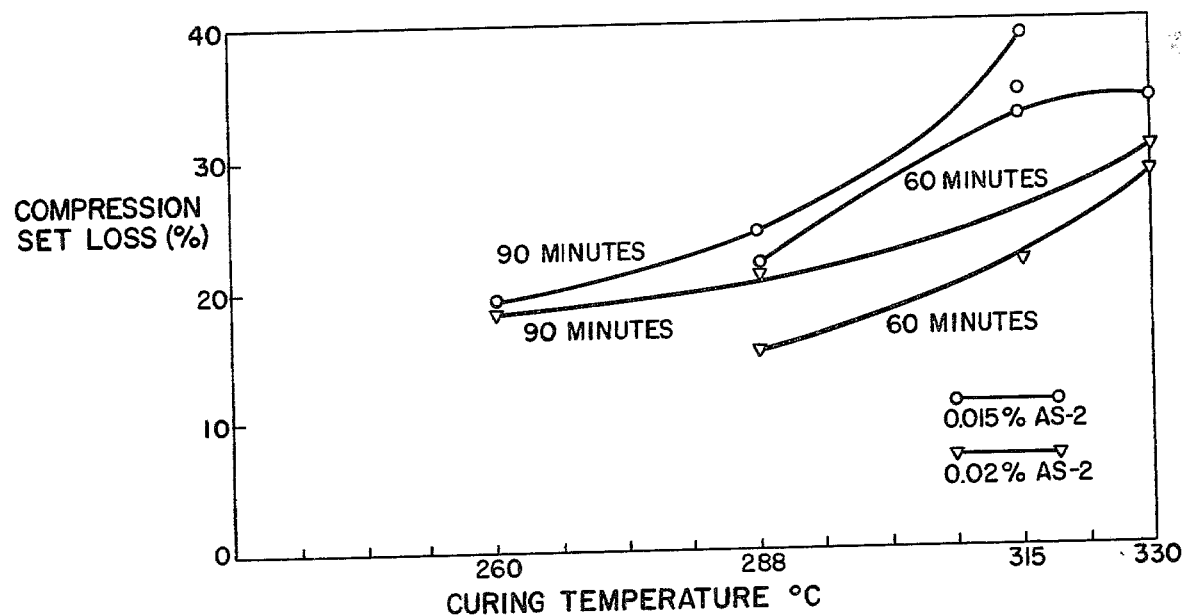
FIG. 3 shows how the mechanical property in question can be varied by thermally postcuring the foam and by incorporating a surfactant in the precursor.

The data resulting from this evaluation are graphically presented in FIG. 3.

As is evident from the data, the properties of the foam—of which compression set is exemplary—are highly dependent on the temperature employed in the postcure cycle and on the duration of that cycle as well.

The preceding examples are concerned with what we term a "free rise" method for converting precursors to flexible, resilient polyimide foams. As discussed above, however, "constrained rise" in an open or closed mold can also be employed.

The following example deals with the constrained rise, open mold technique.

EXAMPLE X

Series 1701-1, 1702-1, and 1720-1 precursors were placed between two 1.25 cm (½ in) thick polypropylene sheets covered with Teflon-coated glass (Taconic 7278) at a powder loading of 12.2–12.7 kg/m$^2$ (2.5–2.6 lbs/ft$^2$). The final thickness of the foam was controlled by placing 17.8 cm (7 in) polypropylene spacers between the sheets. The entire assembly was inserted in the 5 kW microwave oven and the precursor foamed for six minutes at a power output of 3.75 to 5.0 kW. The uncured foam was removed from the microwave oven and thermally postcured.

Data obtained in these tests appear below:

TABLE 13

Properties of Polyimide Foams Produced in an Open Mold

| Foam Resin Number | Surfactant Concentration AS-2 (%) | Density Kg/m³ | Density Lbs/ft³ | Resiliency Ball Rebound | Compression Set Loss After 30 min. Recovery | Type of Foam |
|---|---|---|---|---|---|---|
| 1701-1 | 0.10 | 12.82 | 0.80 | 40-50 | 49 | Good cellular structure with some reticulation. |
| 1701-1 | 0.25 | 16.98 | 1.06 | 45 | 33 | Good cellular structure - some striation present |
| 1701-1 | 0.50 | 15.22 | 0.95 | 55 | 46 | Good cellular structure - some large voids present at the bottom. |
| 1701-1 | 0.75 | 13.62 | 0.85 | 40-45 | 29 | Good cellular structure. |
| 1701-1 | 1.00 | 9.61 | 0.60 | 35 | 30 | Very good cellular structure. |
| 1701-1 | 1.50 | 12.82 | 0.80 | 45-50 | 30 | Very good cellular structure. |
| 1702-1 | 0.10 | 14.42 | 0.90 | 45-50 | 54 | Fine cellular structure with no voids. |
| 1702-1 | 0.25 | 14.42 | 0.09 | 45 | 40 | Fine cellular structure with no voids. |
| 1702-1 | 0.50 | 13.78 | 0.86 | 60 | 43 | Fine cellular structure with few voids. |
| 1702-1 | 0.75 | 12.82 | 0.80 | 40-45 | 40 | Fine cellular structure with no voids. |
| 1702-1 | 1.00 | 9.77 | 0.61 | 40 | 52 | Very good cellular structure - some striation present. |
| 1702-1 | 1.50 | 10.89 | 0.68 | 45-50 | 43 | Very good cellular structure - no flaws. |
| 1720-1 | 0.10 | 24.03 | 1.5 | 50 | 49 | Striation and flaws present. |
| 1720-1 | 0.25 | 25.63 | 1.6 | 45 | 37 | Good cellular structure - some striation present. |
| 1720-1 | 0.50 | 22.43 | 1.4 | 40-45 | 35 | Very good cellular structure - some striation present. |
| 1720-1 | 0.75 | 22.43 | 1.4 | 40 | 34 | Very good cellular structure - some striation present. |
| 1720-1 | 1.0 | 18.42 | 1.15 | 45 | 27 | Very good cellular structure - some striation present. |
| 1720-1 | 1.5 | 16.98 | 1.06 | 35-40 | 27 | Very good cellular structure - some striation present. |

The foams were generally acceptable. However, compression set was considerably inferior to that of foams produced by free rise techniques.

A representative foam produced as described in this Example is shown in the center of FIG. 4.

EXAMPLE XI

Closed, perforated molds were made from Teflon-coated glass, glass filled polyimide molded sheets, Pyrex glass, and polypropylene. The mold was lined with high porosity Teflon-coated glass (Taconic, 7278) to permit the escape of the volatiles formed during foaming. The mold was closed to produce foams to exact configurations.

The process involved placing a 1701-1 precursor in the mold followed by foaming in the 5 kW microwave oven. The foams were removed from the mold after foaming and thermally postcured at 288° C. (550° F.) for one hour.

A foam produced by this technique is shown at the right in FIG. 4.

EXAMPLE XII

We pointed out above that advantage can be taken of the present invention to produce rigid artifacts such as panels as well as flexible, resilient foams.

One procedure for preparing rigid panels, which also demonstrates that our invention can be used to process liquid resin precursors as well as powders, includes the step of compounding a liquid resin precursor with selected fillers in a variable speed, ABBE double shaft mixer until the filler is thoroughly wetted. Glass cloth (120 style) wetted with resin is placed on a sheet of aluminum foil. The resin mixture is spread over the cloth to a depth depending upon the density and thickness desired. The top surface of the panel is then covered with another piece of wetted glass cloth.

Solvent is removed by drying the wet panel in a circulating air oven at 82° C. (180° F.) for 120 minutes or in a microwave oven until 29-31 percent of the solvent has been removed for a phr dilution ratio of 20.

The aluminum foil is removed from the dried pane and the sample placed between two sheets of Teflon coated glass cloth.

The dried panel is further processed by foaming anc curing. Foaming of the panel is carried out in the microwave oven at a power output of 5.0-10 kW between two sheets of microwave compatible material. The samples were cured in a circulating air oven at a temperature of 287.7° C. (550° F.) for 30 minutes and cut to the desired dimensions.

Microwave drying in this and other applications of our invention involving the drying of a precursor containing a liquid resin are in general preferred. The advantages of this technique are shorter drying cycles and more even drying, which results in a superior product.

Particularly in making larger panels, and also in other applications of our invention, we prefer to heat the substrate or mold prior to foaming the precursor, be it a liquid resin or dry powder. This results in greater expansion and a consequent reduction in foam density, which is often advantageous. Preheat temperatures which produce the wanted results are those in the 250°-300° F. range.

Initial tests of promising panels included visual observation followed by density, compressive and flexural strength, and screw withdrawal tests.

Compression tests used the procedure described in ASTM Standard C365. The apparatus was an Instron Model TM-SM compression tester with a full-scale load range of 500 g and a crosshead speed range of 0.05 to 10.0 cm/min.

Direct screw withdrawal tests used the procedure and apparatus described in ASTM Standard D-1761.

Determination of the flexural strength was carried out by a modified form of MIL-STD-401 using a test specimen size of approximately 7.5×17.5 cm (19×6.9 in).

The burning characteristics of the rigid panels were obtained by observing flame penetration at various time intervals up to 10 minutes when the specimen was subjected to a Meker burner, by determination of the smoke density in accordance with the NBS procedure identified in Example I, and by measuring the relative flammability of the panels from determination of the oxygen index (LOI).

The following examples describe, in more detail, the making and evaluation of rigid polyimide foam filled panels by the process we have invented and described in the preceding paragraphs.

EXAMPLE XIII

A 1702-1 liquid resin modified with 2.2 weight percent of Imperial Chemical Company L-170 crosslinking agent was used to make a panel by the process described in Example XII. The filler was composed of Owens Corning type 405 glass strands which had been heated at 800° F. to remove the sizing. Unsized or heat cleaned strands tend to separate into individual small diameter fibers when blended with the liquid resin. This results in a lower foam rise and a finer, higher density cellular structure. Therefore, a lower, less expensive concentration of heat cleaned strands can be used.

The process parameters are summarized in the following table:

TABLE 14

Process Parameters for the Fabrication of Large and Small Wall Panel Cores by the Liquid Process

| Parameter | Area of the Wall Panel Core | |
|---|---|---|
| | 4200/cm² (651 in²) | 413 cm² (64 in²) |
| Loading | 0.119 kg/m² (0.245 lbs/ft²) | 0.119 kg/m² (0.245 lbs/ft²) |
| Thickness | 127 cm (0.50 in.) | 1.27 cm (0.50 in.) |
| Substrate | Pyrex | Pyroceram |
| Glass Strands | 25% 0.635 cm (0.25 in.) | 30% 0.635 cm (0.25 in.) |
| Drying | | |
| Power | 1.25 kW | 1.25 kW |
| Time | 10 minutes | 2.25 minutes |
| Foaming | | |
| Power | 5.0 kW | 5.0 kW |
| Time | 17 minutes | 6 minutes |
| Curing | | |
| Temperature | 288° C. (550° F.) | 288° C. (550° F.) |
| Time | 45 minutes | 30 minutes |

The resulting product is a low density reinforced polyimide which is suited for use as the core of a wall panel in aircraft interiors, for example.

EXAMPLE XIV

Another specific procedure for making a rigid panel differs from that described generally above and from the specific procedure of the preceding example primarily by the technique employed to lay up the panel. Half of the resin and reinforcement mixture was spread on the wetted glass cloth, and this was followed by microwave drying. The remaining mixture was laid up on this layer; this was followed by second stage drying.

This innovation resulted in uniform solvent evolution throughout the panel and improved panel surfaces.

A typical drying cycle for a 1.11 m² (12 ft²) panel was 15 minutes for the first stage followed by 30 minutes for the second stage using a power output of 10 kW.

One rigid panel was produced by the technique just described using 1.59 cm (0.625 in) thick Pyrex plates and the following process parameters.

TABLE 15

| | |
|---|---|
| Resin: | 1702-1 modified with 2.2 percent crosslinking agent. |
| Reinforcement: | 10.5 percent glass microballoons, 3M type C15X |
| | 8.0 percent unsized chopped strands, 0.635 cm (¼ in.) Owens Corning |
| Dry: | Two stage lay up and dry |
| | Power 4 kW, time 35-45 minutes |
| Foam: | Thickness 1.59 cm (0.625 in.) |
| | Power 15 kW |
| Cure: | Thermal oven at 288° C. (550° F.), time dependent on panel area |

Specimens prepared as just described were subjected to the tests identified above with multiple specimens being joined with 0.10 inch unidirectional glass using DMS 1911 epoxy film adhesive in those test requiring a full size (4 ft by 8 ft) panel. Test results are summarized in the table which follows (flammability and smoke density tests were conducted on the core material alone to obtain an accurate indication of their performance in these areas):

TABLE 16

Floor Panel Test Results

| PROPERTY | TEST METHOD | UNITS | GOAL | ACTUAL |
|---|---|---|---|---|
| Weight | D 1622 | Kg/m² | 0.029-0.040 | 0.043 |
| | | lbs/ft² | 0.70-0.95 | 1.03 |
| Thickness | C-366 | cm | | 0.50 |
| | | in | 0.39-0.50 | |
| Compressive Strength | C-365 | N/m² | 11.7 × 10⁶ minimum | 5.9 × 10⁶ |
| | | lb/in² | 1700 minimum | 855 |
| Warpage | — | cm of warp/m | 0.208 | 0.083 |
| | | in of warp/ft | 0.025 | 0.010 |
| Impact Strength | — | Kg-cm | 34.5-41.4 | 34.5 |
| | | in-lb | 30-36 | 30 |
| Gain in Weight after Humidity Aging | — | % | 6.0 max | 3.9 |
| Core Shear Strength | C 393 | N | 1221 | 3046 |
| | | lbf | 275 | 686 |
| Panel Flexure Strength | C 393 | N | 1021 | 995 |
| | | lbf | 230 | 224 |
| Long Beam Bending | — | cm of deflection | 2.03 | 1.02 |
| | | in of deflection | 0.80 | 0.40 |
| Sandwich Peel Strength | 90° Peel | N/m | 1.12 | 1.30 |
| | | lbf/in | 10 | 11.5 |
| Oxygen Index | D-2863 | — | 40 min | 42 |
| Smoke Density | NBS | | 30-50 | 0 |

EXAMPLE XV

Dry particulate precursors can also be employed in manufacturing rigid polyimides by processes employing microwave radiation in accord with the principles of our invention. One such process utilizes a powder precursor in conjunction with microwave heating and constrained foam rise.

Additives are mixed with the powder resin in an Osterizer Blender for 1-2 minutes, and the powder composition is spread on a sheet of Teflon-coated glass. The lay-up techniques used for composites containing liquid resins can be employed to form the panel and to foam and cure the precursor.

Rigid panels have been manufactured by the procedure just described using the following process parameters:

TABLE 17
Process Parameters for the Fabrication of Wall Panel Cores by the Powder Process

| Parameter | 0.991 m² (10.7 ft²) | 0.468 m² (5.04 ft²) |
|---|---|---|
| Loading | 0.070 kg/m² (0.143 lbs/ft²) | 0.070 kg/m² (0.143 lbs/ft²) |
| Thickness | 0.635 cm (0.25 in.) | 0.635 cm (0.25 in.) |
| Lay-up Substrate | M602-0.062 (Taconic Plastics) | M602-0.062 (Taconic Plastics) |
| Coating Thickness | 1.78 cm (0.70 in.) | 1.22 cm (0.48 in.) |
| Foaming Substrate | Pyrex (144 × 123 × 1.60 cm; 57 × 44 × 0.63 in.) | Pyrex (81 × 112 × 1.60 cm; 32 × 44 × 0.63 in.) |
| Reinforcement | 2 sheets 120 style satin weave glass cloth (Owens-Corning) | 2 sheets 120 style satin weave glass cloth (Owens-Corning) |
| Preheat Model | 15 kW (GFE) | 4115 |
| Power | 10 kW | 5 kW |
| Time | 15 minutes | 20 minutes |
| Foaming Power | 10 kW | 5 kW |
| Time | 20 minutes | 20 minutes |
| Curing Model | Despatch | Blue M |
| Temperature | 288° C. (550° F.) | 288° C. (550° F.) |
| Time | 60 minutes | 45 minutes |

EXAMPLE XVI

In one instance panels having dimensions of 0.81×1.22 m (32×48 in.) were produced essentially as described in Example XV from a 1702-1 powder resin modified with 3 percent AS-2 and 1.5 percent Imperial Chemical Company L-170 cross-linking agent and foamed between two coated 120 style satin weave glass fabrics at 10 kW for 20 minutes followed by a thermal postcure at 288° C. (550° F.) for a period of one hour. This one-step microwave process produced a panel with facing skins bonded to the core.

Physical properties of these panels are identified in the following table:

TABLE 18

Low Density Wall Panel

| PROPERTY | METHOD | UNITS | GOAL | ACTUAL |
|---|---|---|---|---|
| Density | ASTM D 1622 | lb/ft³ | 1.0–5.0 (1) | 8.39 (2) |
|  |  | Kg/m³ | 16–80 | 134.2 (2) |
| Weight |  | lb/ft² | 0.25–0.30 (3) | 0.175 (2) |
|  |  | Kg/m² | 1.23–1.48 | 0.86 |
| Machinability | — | in | 0.032 Breakout | <0.0312 |
|  |  | cm | 0.029 Maximum | <0.029 |
| Direct Screw | ASTM D 1761 | lbf | 150 | 196 |
|  |  | N | 668 | 872 |
| Sandwich Peel Strength | 90° Peel | lbf | 10 | 13.2 |
|  |  | N | 45 | 59.4 |
| Water Absorption | ASTM D 2842-69 | % | 3 Maximum | 4.0 |
| Oxygen Index | ASTM D 2863 | — | 40 Minimum | 42 |
| Smoke Density DS Uncorrected | NBS | — | 30–50 | 5 |
| TGA | — | °C. | Stable to 204.4 | 400 |
|  |  | °F. | Stable to 400 | 750 |

(1) Core only
(2) Includes integral skin
(3) Finished panel

EXAMPLE XVII

One other representative type of product that can be advantageously manufactured by employing our invention is thermal acoustical insulation.

These materials are produced from essentially the same particulate polyimide foam precursors and by the same processes used to make flexible resilient foams. Glass fibers, glass microballoons, and other additives are compounded into the powder by milling in a ball mill or by blending in a high speed blender. These compositions are foamed by microwave techniques.

One thermal acoustical insulation was produced as just described by microwave processing of a 1702-1 precursor modified with 3 percent AS-2 surfactant and 20 percent Fiberfrax milled fibers.

A power output of 10 kW was used for foaming, and this was followed by 20 minutes at 15 kW and heating in the circulating air oven at 287.7° C. (550° F.) to cure the insulation.

Actual properties of the resulting insulation are compared with projected goals in the following table:

TABLE 19

Thermal Acoustical Insulation 1702 Resin 3% AS-2

| PROPERTY | ASTM Method | Units | Goal | Actual |
|---|---|---|---|---|
| Density | D-1564 | Kg/m³ | 9.6 | 9.6 |
|  |  | lbs/ft³ | 0.6 max | 0.6 |
| Breaking Strength | CCC-T-191 | N/m | 175.1 | 893.0 |
|  |  | lbs/in | 1.0 min | 5.1 |
| Wicking as received |  | Water immersion | 1.0 max | None |
|  |  | cm | 0.25 max | None |
|  |  | in |  |  |

TABLE 19-continued

| PROPERTY | Thermal Acoustical Insulation 1702 Resin 3% AS-2 | | | |
|---|---|---|---|---|
| | ASTM Method | Units | Goal | Actual |
| | | precipitate | None | None |
| Wicking after oven drying 71.1° C. (160° F.) | Water immersion | cm | 1.0 max | None |
| | | in | 0.25 max | None |
| | | precipitate | None | None |
| Flexibility | | deterioration after bending on one-foot radius | None | None |
| Corrosion (Aluminum) | | Fitting | None | None |
| Elevated Temperature Resistance | | Weight loss | 15 mg max | 7 mg |
| Oxygen Index | D-2865 | % oxygen | 40 min | 42 |
| Smoke Density DS Uncorrected | NBS | Optical Density | 30–50 max | 2.0 |
| Vertical Bunsen Burner Test, 60 seconds | | Flame Time seconds | 10 max | 0 |
| | | Burn length | | |
| | | cm | 15 max | 3.0 |
| | | in | 6 max | 1.2 |
| | | Dripping | | None Detectable |
| Vibration | | 1 Hr 30 Hz 5 cm amplitude | No damage | None |
| Acoustical Properties | | Absorption Coefficient | | |
| | | 1000 Hz | 0.869* | 0.569 |
| | | 2000 Hz | 0.851* | 0.928 |
| | | 3000 Hz | 0.998* | 0.999 |

*Owens Corning PL 105 500W

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by U.S. Letters Patent is:

1. A method of preparing a polyimide from a non-polymeric precursor comprising an ester of a tetracarboxylic acid and one or more primary diamines which includes the step of exposing said precursor to microwave radiation having a frequency of at least 915 mHz for periods of sufficient duration to develop a cellular physical structure and to at least partially develop a polyimide chemical structure.

2. A method of preparing a polyimide as defined in claim 1 wherein the material produced by exposing the precursor to microwave radiation is thereafter post-cured by heating it at a temperature on the order of 250°–550° F. for 40 to 200 minutes.

3. A method of preparing a polyimide as defined in claim 1 wherein the precursor is exposed to microwave radiation for a total of 2 to 55 minutes.

4. A method of preparing a polyimide as defined in claim 1 wherein the precursor is exposed to the microwave radiation at a power output of at least 3.75 kW.

5. A method of preparing a polyimide as defined in claim 5 wherein the microwave radiation to which the precursor is exposed has a frequency of about 2450 mHz.

6. A method of preparing a polyimide as defined in claim 1 which employs a microwave radiation power output to unit weight of precursor ratio in the range of 0.6 to 1 kW/kg.

7. A method of preparing a polyimide as defined in claim 1 wherein the precursor is exposed to microwave radiation at a first power output to develop a foam and to microwave energy at a second, higher power output to develop the polyimide chemical structure.

8. A method of preparing a polyimide as defined in claim 1 wherein the precursor is exposed to pulses of microwave radiation, the duration of the pulses and of the intervals therebetween being on the order of 60 and 20 seconds, respectively.

9. A method of preparing a polyimide as defined in claim 1 in which the precursor is exposed to microwave radiation in a microwave cavity and wherein the cavity is heated to a temperature of at least 250° F. and less than 450° F. while the precursor is exposed to said microwave radiation.

10. A method of preparing a polyimide as defined in claim 1 wherein a conductive filler is admixed with said precursor prior to exposing it to microwave radiation to promote the conversion of the precursor to a polymeric material.

11. A method of preparing a polyimide as defined in claim 10 wherein the conductive filler is activated carbon or graphite and wherein said conductive filler is present in said precursor in an amount ranging from 5 to less than 20 weight percent.

12. A method of preparing a polyimide as defined in claim 1 in which the precursor is preheated at a temperature of not more than 300° F. for 2 to 6 minutes before it is exposed to the microwave radiation.

13. A method of preparing a polyimide as defined in claim 12 in which the precursor is preheated at a temperature of 250° F.

14. A method of preparing a polyimide as defined in claim 1 which includes the step of preheating said support to a temperature of 250°-300° F. prior to exposing said precursor to said microwave radiation.

15. A method of preparing a polyimide as defined in claim 1 wherein the precursor exposed to the microwave radiation is a liquid resin.

16. A method of preparing a polyimide as defined in claim 15 wherein said liquid resin precursor is dried by exposing it to microwave radiation for a period of 3 to 5 minutes before the cellular and polymeric structures are developed therein.

17. A method of preparing a polyimide as defined in claim 16 wherein said precursor is dried by exposing it to microwave radiation at a power output of not more than 1.25 kW and wherein the cellular and polymeric structures are developed by exposing the dried material to microwave radiation at a power output of at least 3.75 kW.

18. A method of preparing a polyimide as defined in claim 1 wherein the precursor exposed to microwave radiation is a dry particulate solid.

19. A method of preparing a polyimide as defined in claim 18 wherein said precursor is loaded on a support that is compatible with microwave radiation to a depth of at least 0.5 cm prior to exposing it to said microwave radiation.

20. A method of preparing a polyimide as defined in claim 19 wherein the loading of the particulate precursor is at least 1.6 kg/m$^2$.

21. A method of preparing a polyimide as defined in claim 20 wherein said precursor is convertible into a copolyimide and wherein said loading is on the order of 4.3 kg/m$^2$.

22. A method of preparing a polyimide as defined in claim 20 wherein said precursor is convertible into a terpolyimide and wherein said loading is on the order of 7.7 kg/m$^2$.

23. A method of preparing a polyimide as defined in claim 19 wherein the thickness of the powder on the support is on the order of 10 cm.

24. A method of preparing a polyimide as defined in claim 18 wherein the precursor is shaped into a square bed before it is exposed to microwave radiation.

25. A method of preparing a polyimide with a cellular structure which comprises the steps of: forming a primary diamine, 3,3',4,4'-benzophenonetetracarboxylic acid ester solution by dissolving one or more diamines and the aforesaid acid or an anhydride thereof in a lower alkyl alcohol; atomizing said solution; drying the droplets obtained by atomizing the diamine, ester solution with a heated gas to form a dry, particulate, non-polymeric precursor; and exposing said precursor to microwave radiation having a frequency of at least 915 mHz for periods of sufficient duration to develop a cellular physical structure and to at least partially develop a polyimide chemical structure.

26. A method of preparing a polyimide as defined in claim 25 in which the atomized droplets of diamine, ester solution are dried in a chamber having an inlet and an outlet for a heated gas and in which the inlet temperature of said gas is maintained in the range of 100°-110° C. and the outlet temperature thereof is limited to a maximum of 80° C.

27. A method of preparing a polyimide precursor as defined in claim 26 wherein the outlet temperature of said gas is controlled by regulating the rate of feed of the diamine, ester solution to the chamber in which said solution is dried.

28. A method of preparing a polyimide as defined in claim 26 which includes the step of reducing the precursor to particles having a size distribution of ca. 300 microns×0 prior to exposing said precursor to microwave radiation.

29. A method of preparing a polyimide from a precursor containing substantially equimolar amounts of a half ester of 3,3',4,4'-benzophenonetetracarboxylic acid and one or more primary diamines, said process including the step of exposing said precursor to microwave energy having a frequency of at least 915 mHz for a period of sufficient duration to develop a cellular physical structure and to at least partially develop a polymeric chemical structure.

30. A method of preparing a polyimide as defined in claim 29 wherein the precursor contains a plurality of diamines, one of said diamines being heterocyclic and having nitrogen in the ring, another of said diamines being a para- or meta-substituted aromatic diamine which is free of aliphatic moieties, and any additional diamine being either a heterocyclic or an aromatic diamine as aforesaid.

31. A method of preparing a polyimide as defined in claim 30 wherein said heterocylic diamine is present in said precursor in a ratio of 0.3 to 0.6 mole of diamine per mole of 3,3',4,4'-benzophenonetetracarboxylic acid ester.

32. A method of preparing a polyimide as defined in claim 29 wherein the precursor contains at least three diamines, one of said diamines being heterocyclic and having nitrogen in the ring, another of said diamines being a para- or meta-substituted aromatic diamine which is free of aliphatic moieties, and a third of said diamines being aliphatic.

33. A method of preparing a polyimide as defined in claim 32 wherein the liquid resin contains from 0.05 to 0.3 mole of aliphatic diamine and from 0.1 to 0.3 mole of heterocyclic diamine per mole of 3,3',4,4'-benzophenonetetracarboxylic acid ester.

34. A method of preparing a polyimide as defined in claim 32 wherein the aliphatic diamine in the liquid resin has from three to twelve carbon atoms.

35. A method of preparing a polyimide as defined in claim 32 wherein the aliphatic diamine in the liquid resin has the formula

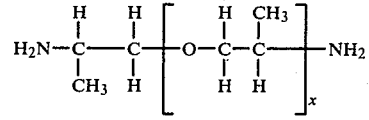

where x is on the order of 2.6.

36. A method of preparing a polyimide as defined in either of the preceding claims 29 or 35 wherein the aromatic and heterocyclic diamines in the precursor are selected from the following group:
2,6-diaminopyridine
3,5-diaminopyridine
3,3'-diaminodiphenyl sulfone
4,4'-diaminodiphenyl sulfone
4,4'-diaminodiphenyl sulfide
3,3'-diaminodiphenyl ether
4,4'-diaminodiphenyl ether
meta-phenylene diamine para-phenylene diamine
p,p'-methylene dianiline
2,6-diamino toluene
2,4-diamino toluene 37. A method of preparing a polyimide as defined in claim 29 wherein the precursor also contains from 0.015 to 1.5 weight percent of a surfactant capable of enhancing physical properties of the polyimide.

* * * * *

UNITED STATES PATENT AND TRADEMARK OFFICE
CERTIFICATE OF CORRECTION

PATENT NO. : 4,305,796

DATED : December 15, 1981

INVENTOR(S) : John Gagliani et al

It is certified that error appears in the above—identified patent and that said Letters Patent is hereby corrected as shown below:

```
Column 3, line 47, change "Alipathic" to --Aliphatic--.
Column 8, line 67, change "open" to --oven--.
Column 20, line 28, change "pane" to --panel--.
Column 22, line 34, change "test" to --tests--.
Table 14, after the last line, add
   --   Time           45 minutes            30 minutes --.
```

Signed and Sealed this

Twenty-fifth Day of May 1982

[SEAL]

Attest:

*Attesting Officer*

GERALD J. MOSSINGHOFF

*Commissioner of Patents and Trademarks*

REEXAMINATION CERTIFICATE (308th)

United States Patent [19]

Gagliani et al.

[11] B1 4,305,796

[45] Certificate Issued  Feb. 26, 1985

[54] METHODS OF PREPARING POLYIMIDES AND ARTIFACTS COMPOSED THEREOF

[75] Inventors: John Gagliani; Raymond Lee; Anthony L. Wilcoxson, all of San Diego, Calif.

[73] Assignee: IML Corporation

Reexamination Request:
No. 90/000,589, Jul. 11, 1984

Reexamination Certificate for:
Patent No.: 4,305,796
Issued: Dec. 15, 1981
Appl. No.: 186,629
Filed: Sep. 12, 1980

Certificate of Correction issued May 25, 1982.

[51] Int. Cl.³ .................. C08G 18/14; C08G 63/40
[52] U.S. Cl. .................. 204/159.19; 204/159.11; 521/185; 521/915; 528/353
[58] Field of Search .......... 204/159.19, 159.11; 521/185, 915; 528/353

[56] References Cited

U.S. PATENT DOCUMENTS

| | | | |
|---|---|---|---|
| 2,187,877 | 1/1940 | Ferris et al. | 260/85 |
| 2,880,794 | 4/1959 | Marshall | 159/48 |
| 3,049,174 | 8/1962 | Marshall | 159/4 |
| 3,506,583 | 4/1970 | Boram et al. | 252/188.3 |
| 3,644,305 | 2/1972 | Frisque et al. | 260/80.3 N |

FOREIGN PATENT DOCUMENTS

294843 11/1971 U.S.S.R.
414276 2/1974 U.S.S.R.

OTHER PUBLICATIONS

AAS Conference, 10/30/78, "Thermally Stable Polyimide Components for Space and Commercial Applications".
Congress of International Astronautical Federation, 9/79, "Non-Flammable Polyimide Materials for Aircraft and Spacecraft Applications".
Institute of Environmental Sciences, 4/79, "Non-Flammable Polyimide Materials for Commercial Application", pp. 37–43.
U.S. Dept. of Energy Contractors' Meeting, 3/79, "Development of Polyimide Materials for Use in Solar Energy Systems", pp. 129–130.
NASA Final Report "Development of Fire-Resistant, Low Smoke Generating, Thermally Stable End Items for Aircraft and Spacecraft", published 10/8/77.
Paper entitled "Thermally Stable Polyimide Components for Space and Commercial Applications" dated on or about 10/30/78.

*Primary Examiner*—Morton Foelak

[57] ABSTRACT

Methods of converting essentially unpolymerized precursors into polyimides in which the precursors are exposed to microwave radiation. Preheating, thermal post-curing, and other techniques may be employed to promote the development of optimum properties; and reinforcements can be employed to impart strength and rigidity to the final product. Also disclosed are processes for making various composite artifacts in which non-polymeric precursors are converted to polyimides by using the techniques described above.

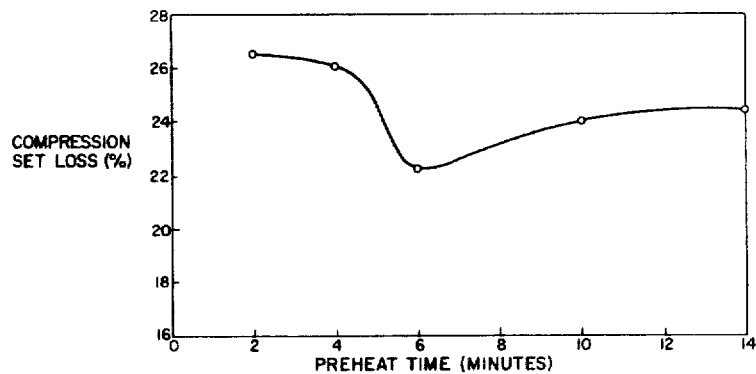

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4 lines 54-64:

One suitable spray drying process is described in co-pending application Ser. No. 186,670 filed Sept. 12, 1980, *now U.S. Pat. No. 4,296,280*. In general that process involves the atomization of the feedstock followed by entrainment of the droplets thus formed in a swirling annulus of heated air (or other gas). This produces almost instantaneous drying of the droplets. Optimum results are typically obtained by employing spray dryer chamber gas inlet temperatures in the range of 100°-110° C. and by so regulating the flow of material through the dryer as to limit the chamber outlet temperature of the gas to 80° C.

AS A RESULT OF REEXAMINATION, IT HAS BEEN DETERMINED THAT:

Claims 1-24 and 29-37 are cancelled.

Claim 25 is determined to be patentable as amended.

Claims 26-28, dependent on an amended claim, are determined to be patentable.

New claim 38 is added and determined to be patentable.

25. A method of preparing a polyimide with a cellular structure which comprises the steps of: forming a primary diamine, 3,3',4,4'-benzophenone-tetracarboxylic acid ester solution by dissolving one or more diamines and the aforesaid acid or an anhydride thereof in a lower alkyl alcohol; atomizing said solution; drying the droplets obtained by atomizing the diamine, ester solution with a heated gas *in a chamber, the outlet temperature of the chamber being limited to a maximum of 80° C.* to form a dry, particulate, nonpolymeric precursor; and exposing said precursor to microwave radiation having a frequency of at least 915 [mHz] *MHz* for periods of sufficient duration to develop a cellular physical structure and to at least partially develop a polyimide chemical structure.

*38. A method of preparing a polyimide from a nonpolymeric precursor comprising an ester of a tetracarboxylic acid and one or more primary diamines which includes the step of exposing said precursor to microwave radiation having a frequency of at least 915 MHz for periods of sufficient duration to develop a cellular physical structure and to at least partially develop a polyimide chemical structure wherein the precursor is exposed to microwave radiation at a first power output to develop a foam and to microwave energy at a second, higher power output to develop the polyimide chemical structure.*

* * * * *